L. H. COBB.

SAFETY RAZOR.

APPLICATION FILED APR. 5, 1912.

Reissued May 20, 1913.

13,563.

2 SHEETS—SHEET 1.

Witnesses

Elizabeth Jeffrey

Halbert L. Brown.

Inventor

Lyman H. Cobb

By Chas. H. Chase his Attorneys

L. H. COBB.

SAFETY RAZOR.

APPLICATION FILED APR. 5, 1912.

Reissued May 20, 1913.

13,563.

2 SHEETS—SHEET 2.

Witnesses

Elizabeth Griffith

Halbert Brown

Inventor

Lyman H. Cobb

By Chas. T. Chase his Attorneys

UNITED STATES PATENT OFFICE.

LYMAN H. COBB, OF FITCHBURG, MASSACHUSETTS, ASSIGNOR, BY MESNE ASSIGNMENTS, TO YOUNG SAFETY RAZOR COMPANY, OF PHILADELPHIA, PENNSYLVANIA, A CORPORATION OF NEW JERSEY.

SAFETY-RAZOR.

13,563. Specification of Reissued Letters Patent. Reissued May 20, 1913.

Original No. 996,617, dated July 4, 1911, Serial No. 335,867. Application for reissue filed April 5, 1912. Serial No. 688,793.

*To all whom it may concern:*

Be it known that I, LYMAN H. COBB, a citizen of the United States, residing at Fitchburg, in the county of Worcester and Commonwealth of Massachusetts, have invented a new and useful Improvement in Safety-Razors, of which the following is a specification, accompanied by drawings forming a part of the same, in which—

Figure 1:
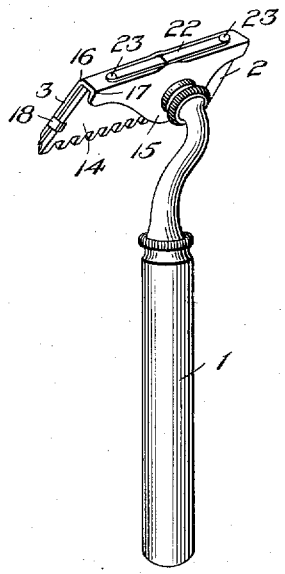
Figure 7:
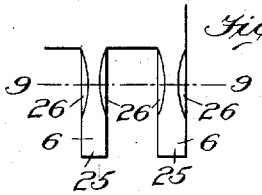
Figure 8:
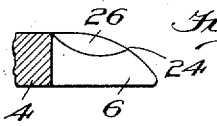
Figure 9:
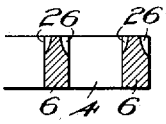
Figure 2:
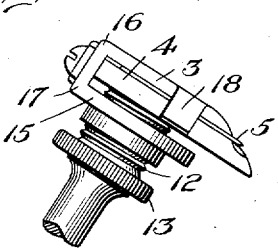
Figure 4:
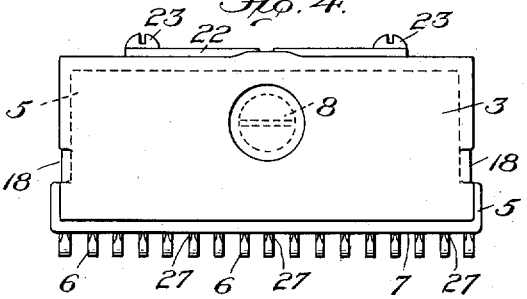
Figure 3:
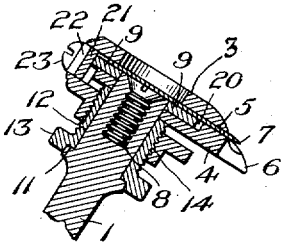
Figure 5:
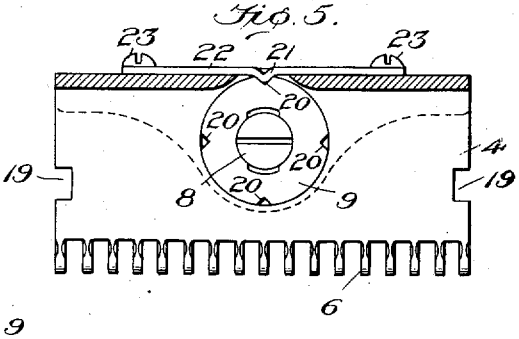
Figure 6:
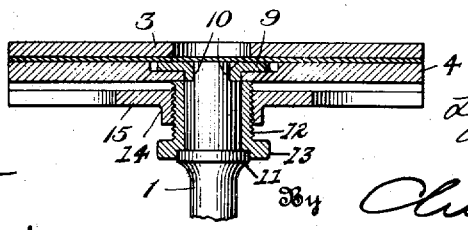
Figure 10:
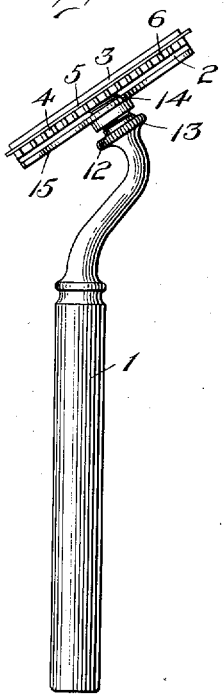
Figure 11:
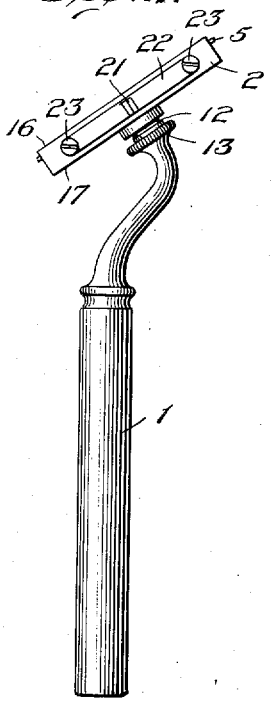
Figure 12:
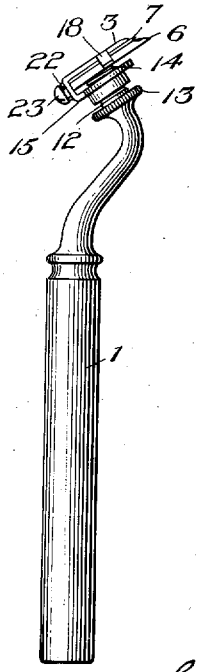

Figure 1 represents in perspective view a safety razor embodying my invention. Fig. 2 is a side view of the head of the razor. Fig. 3 is a central transverse sectional view of the head of the razor. Fig. 4 is a top view. Fig. 5 is a top view with the upper clamping plate removed. Fig. 6 is a central longitudinal sectional view through the head of the razor. Fig. 7 is an enlarged top view of one of the guard teeth. Fig. 8 is a side view of the same. Fig. 9 is a sectional view on the line 9—9, Fig. 7. Figs. 10 and 11 show the head of the razor rotated on the handle with its longitudinal axis at an oblique angle to the handle. Fig. 12 shows the head of the razor rotated into a position opposite that shown in Fig. 1.

Similar reference numbers refer to similar parts in the different views.

My present invention relates to certain improvements in that class of razors known as safety razors in which a cutting blade is securely clamped between clamping plates forming part of the head of the razor, and the edge of the cutting blade is protected by the guard teeth, and my invention consists in the construction and arrangement of the parts as hereinafter described and pointed out in the annexed claims.

Referring to the accompanying drawings, 1 denotes the handle, and 2 the head of my improved safety razor, said head comprising clamping plates 3 and 4 between which is clamped a cutting blade 5. The clamping plate 4 is provided on one edge with a series of teeth 6, over the curved upper surface of which the cutting edge 7 of the blade 5 slightly projects in the usual manner in instruments of this class. The clamping plate 4 is attached to the end of the handle 1 by means of a screw 8 and a circular washer 9. The end of the handle 1 is cut away on diametrically opposite sides as shown at 10, Fig. 6, and enters a correspondingly shaped hole in the washer 9, in order to prevent the washer 9 from turning on the end of the handle.

Journaled on the handle 1, between the plate 4 and an annular shoulder 11 of the handle, is a rotatable screw threaded sleeve 12, having a knurled flange 13 by which the sleeve may be turned by the operator. The screw threaded sleeve 12 enters a screw threaded hole 14 in the flange 15 which is a continuation of the clamping plate 3 and parallel therewith; said clamping plate 3 being bent at right angles at 16 and 17, in order to bring the flange 15 parallel with the plate 3. As the screw threaded sleeve 12 is rotated on the handle the flange 15 and connected plate 3 is raised or lowered, according to the direction in which the screw threaded sleeve is rotated. By raising the plate 3 the space between the plates 4 and 3 is increased, thereby releasing the cutting blade 5, and by lowering the flange 15 of plate 3 the cutting blade 5 is securely clamped between the two plates. Lugs 18 at opposite ends of the plate 3 and integral therewith, are turned downwardly, and engage corresponding notches 19 in the opposite ends of the plate 4. The lugs 18, 18 serve to guide the movements of the plates as they approach and recede from each other and also act as stops to limit the longitudinal movement of the cutting blade 5 as it is clamped between the plates 3 and 4. The flange 15 and plates 3 and 4 are free to rotate on the end of the handle while the washer 9 is held from rotating by the handle, and the washer is provided with equidistant notches 20, preferably four in number, and these notches are successively engaged by the bent section 21 of the spring 22 attached by screws 23 to the rear edge of the plate 3. The notches 20 are so arranged on the periphery of the washer 9 that when they are engaged by the spring 22 the head would be maintained on the end of the handle in either one of the four positions as shown in Figs. 1, 10, 11 and 12, as may be most desirable for the application of the cutting blade to the face. If desired, the number of notches in the periphery of the washer 9 may be increased, and the number of positions in which the cutting blade may be held relatively to the handle correspondingly multiplied.

The guard teeth 6 which project from one edge of the clamping plate 4 have their upper surfaces slightly curved at 24, and the distance which the cutting edge 7 of the blade 5 projects over the curved surface 24 determines the closeness of the cut. The tops of the teeth 6 are made sufficiently broad to provide suitable bearing surfaces 25 to rest against the skin and in order to prevent the beard from being pressed down out of the way of the cutting edge of the blade by the width of the teeth, I cut away portions of the teeth on opposite sides as at 26, 26, in order to reduce the width of the bearing surface of the teeth at point 27 or directly in front of the cutting edge of the blade, thereby enabling the beard which may have been pressed down by the broad tip of the teeth to rise and be suitably presented to the cutting edge of the blade.

Figs. 1, 10, 11 and 12 represent four different positions of the head of the razor relatively to the handle in which position the head is locked by the engagement of the spring 22 with one of the notches 20 in the circular disk 9. These changes in position greatly facilitate manipulation when the razor is changed from one hand to the other, or from one side of the face to the other, or when the razor is held by one person in the operation of shaving another. While the stiffness of the spring 22 is sufficient to securely hold the head of the razor in any desired position, it allows the immediate and rapid change of the head from one position to another as may be desired in the operation of shaving.

I claim:

1. In a safety razor, a clamping plate bent upon itself to form a flange parallel with said plate and having a screw threaded opening, a handle passing through said flange and provided with a shoulder, a second clamping plate attached to the end of said handle, and a screw threaded rotatable sleeve journaled on said handle and held from longitudinal movement between said second clamping plate and said shoulder, with its screw threads engaging the screw threaded opening in said flange.

2. In a safety razor, the combination with a handle and a pair of clamping plates for holding a razor blade held in parallel planes at the end of the handle, and a rotatable externally screw threaded sleeve journaled on the end of said handle and held from longitudinal movement and operatively connected with one of said clamping plates, whereby it is moved toward or away from the other clamping plate by the rotation of said sleeve.

3. In a safety razor, the combination with a handle and a clamping plate attached to one end of said handle, of a second movable clamping plate outside said attached clamping plate, and having a flange extending around one edge of said attached clamping plate and embracing said handle, and a screw threaded sleeve engaging said flange and rotatable on said handle, whereby said movable clamping plate is drawn toward said attached clamping plates.

4. In a safety razor, the combination with a handle, of a circular washer non-rotatably attached to the end of said handle, and provided with a series of peripheral notches, a head comprising means for holding a razor blade and rotatable about the end of said handle, and means carried by said head for engaging the notches in said washer.

5. In a safety razor, the combination with a handle and a rotatable head for holding a razor blade, of a washer non-rotatably held on the end of said handle, and a spring carried by said head and engaging said washer, whereby said head is locked in position.

6. In a safety razor, the combination with blade holding devices, of a handle oblique thereto, means securing the handle to said devices and permitting it to rotate about an axis other than its own while yieldingly resisting such movement, a blade in the plane of said holding devices, and means rigidly securing the blade to the holding devices and permitting rotation of the handle; whereby the blade and holding devices readily rotate upon the handle and in their own plane while rigidly locked together.

7. In a safety razor, the combination with a handle, of a guard and blade oblique to the axis of the handle and mounted upon the latter to rotate in their own plane, means for clamping the blade and guard together and means for locking the guard and blade clamped thereto at any desired point in their rotary path.

8. In a safety razor, the combination with a handle, of a guarded blade oblique to the axis of the handle and mounted upon the latter to rotate in its own plane while held against other displacement, and means for yieldingly holding it in any desired adjustment about its axis of rotation.

9. In a safety razor, the combination with blade holding means, of a blade, a guard, a handle and means for yieldingly and positively securing the handle to said blade holding means and arranged to revolve bodily through substantially a complete revolution about an axis lying outside of said handle.

10. In a safety razor, the combination with blade holding means, of a blade, a guard, a handle and means for yieldingly and positively securing the handle to said blade holding means at an angle to an axis which is substantially perpendicular to the plane of the blade, said handle being arranged to revolve bodily through substantially a complete revolution about said axis.

11. In a safety razor, the combination with blade holding means, of a blade, a guard, a handle, means for pivotally securing said handle to said blade holding means, said handle being arranged to revolve bodily through a complete revolution about the axis of said pivotal means said axis lying outside the said handle, and means for positively and yieldingly holding said handle in any desired position about said axis.

12. In a safety razor, the combination with blade holding means, of a blade, a guard, a handle, means for revolubly securing said handle to said blade holding means, the axis of said securing means being perpendicular to said blade and outside of said handle, and means for retaining said handle at any desired position during its adjustment.

13. In a safety razor, the combination with blade holding means, of a guard, a handle secured to said blade holding means and revoluble about an axis other than its own, and co-acting means carried by said blade holding means and said handle for retaining said handle at any desired position during its adjustment.

14. In a safety razor, the combination with a blade, of a guard against which said blade is clamped, blade holding means, a handle, and means at right angles to said blade for maintaining said handle in pivotal relation with said blade and guard to permit of adjustment in the plane of the blade without releasing the blade from the guard holding means, the axis of said handle being arranged at a fixed angle with the axis of said pivotal means.

15. In a safety razor, the combination with a blade, of a guard for said blade, a bed-plate, a clamping plate between which and the bed plate the blade is clamped, a handle, and means at right angles to said blade for maintaining said handle in pivotal engagement with said clamping plate independently of the clamping action between the parts whereby the blade, guard and bed plate may be adjusted in the plane of the blade without being released from each other, the axis of said handle being arranged at a fixed angle with the axis of said pivotal means.

16. In a safety razor, the combination with a handle, of a guarded blade oblique to the axis of the handle and secured thereto by yielding devices allowing it to rotate in its own plane when rotary force exceeds a predetermined limit; whereby the position of the cutting edge with respect to the angle made with the handle's axis may, without preliminary manipulation or the separation of any part, be varied at will by rotating the blade in its own plane.

17. In a safety razor, the combination with a clamping plate, of a handle rotatably secured at a fixed oblique angle thereto, one of said parts being provided with a plurality of recesses and the other having a co-operating projection or projections to engage said recesses and a guard.

LYMAN H. COBB.

Witnesses:
ALDRICH H. MEYER,
WERNER A. LOFGUIST.